United States Patent
Dube et al.

(10) Patent No.: US 12,541,956 B2
(45) Date of Patent: Feb. 3, 2026

(54) AUTOMATED DATA LABELING USING A GEOMETRIC APPROACH

(71) Applicant: International Business Machines Corporation, Armonk, NY (US)

(72) Inventors: Parijat Dube, Yorktown Heights, NY (US); John Ronald Kender, Leonia, NJ (US); Bishwaranjan Bhattacharjee, Yorktown Heights, NY (US); Brian Michael Belgodere, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 17/705,595

(22) Filed: Mar. 28, 2022

(65) Prior Publication Data
US 2023/0326186 A1 Oct. 12, 2023

(51) Int. Cl.
G06V 10/774 (2022.01)
G06V 10/74 (2022.01)
G06V 10/762 (2022.01)

(52) U.S. Cl.
CPC ........ *G06V 10/7747* (2022.01); *G06V 10/761* (2022.01); *G06V 10/762* (2022.01)

(58) Field of Classification Search
CPC .............. G06V 10/761; G06V 10/762; G06V 10/7747; G06V 10/82
See application file for complete search history.

(56) References Cited

U.S. PATENT DOCUMENTS

| | | | |
|---|---|---|---|
| 9,710,729 B2 | 7/2017 | Chidlovskii et al. | |
| 11,537,719 B2 | 12/2022 | Li et al. | |
| 2016/0253597 A1 | 9/2016 | Bhatt et al. | |
| 2019/0266487 A1 | 8/2019 | Chollet | |
| 2019/0354850 A1 | 11/2019 | Watson et al. | |
| 2020/0082210 A1* | 3/2020 | Watson | G06F 18/22 |
| 2020/0380023 A1 | 12/2020 | Corrado et al. | |
| 2025/0157188 A1 | 5/2025 | Dube et al. | |

FOREIGN PATENT DOCUMENTS

| | | |
|---|---|---|
| CN | 108197670 A | 6/2018 |
| CN | 108230339 A | 6/2018 |
| CN | 112418331 A | 2/2021 |
| CN | 113609927 A | 11/2021 |

OTHER PUBLICATIONS

Zhang B, Zhang X, Cheng F, Zhao D. Few Shot Learning with Simplex. arXiv preprint arXiv:1807.10726. Jul. 27, 2018. (Year: 2018).*

(Continued)

*Primary Examiner* — Vu Le
*Assistant Examiner* — Tracy Mangialaschi
(74) *Attorney, Agent, or Firm* — Kristofer Haggerty

(57) ABSTRACT

An automated data labeling method, system, and computer program product that includes composing a semantically-named anchor vector derived from a source dataset into a sequence that defines a location description for target data items based on a generalization of distances into Cayley-Menger content and outputting a label for a target data item based on the location description.

20 Claims, 13 Drawing Sheets

(56) References Cited

OTHER PUBLICATIONS

Huang, Sheng, Ahmed Elgammal, and Dan Yang. "On the effect of hyperedge weights on hypergraph learning." Image and Vision Computing 57 (2017): 89-101. (Year: 2017).*

Chang, Chein-I., et al. "Recursive geometric simplex growing analysis for finding endmembers in hyperspectral imagery." IEEE Journal of Selected Topics in Applied Earth Observations and Remote Sensing 10.1 (2016): 296-308. (Year: 2016).*

Deng et al. "Large-Scale Object Classification Using Label Relation Graphs", European Conference on Computer Vision, 2014, pp. 48-64, https://link.springer.com/chapter/10.1007/978-3-319-10590-1_4.

Kender et al. "G2L: A Geometric Approach for Generating Pseudo-labels that Improve Transfer Learning", arXiv:2207.03554, Jul. 7, 2022, 21 pages, https://doi.org/10.48550/arXiv.2207.03554.

Pham et al. "Meta Pseudo Labels", arXiv:2003.10580, Mar. 1, 2021, 22 pages, https://doi.org/10.48550/arXiv.2003.10580.

Qi Fang. "Potential Energy Distance Based Image Retrieval" The Pennsylvania State University, The Graduate School, Eberly School of Science, Aug. 2013, 69 pages.

Xie et al. "Self-training with Noisy Student improves ImageNet classification", arXiv:1911.04252, Jun. 19, 2020, 18 pages.

Mel, et al. "The NIST Definition of Cloud Computing". Recommendations of the National Institute of Standards and Technology. Nov. 16, 2015.

\* cited by examiner

| DATA LABELING BY ASSIGNING LABELS TO UNLABELED EXAMPLES OF DATA USING A GEOMETRIC MEASURE ON AN EMBEDDING SPACE TO PRODUCE LABELED EXAMPLES | — 101 |

↓

| PRODUCING THE LABELED EXAMPLES ACCORDING TO METHOD 200 | — 102 |

↓

| TRAINING WITH THE DATA AND THE LABELED EXAMPLES IN A SUPERVISED SETTING TO GENERATE A MODEL | — 103 |

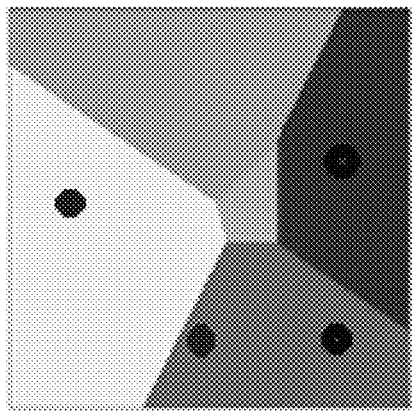
FIG. 5B
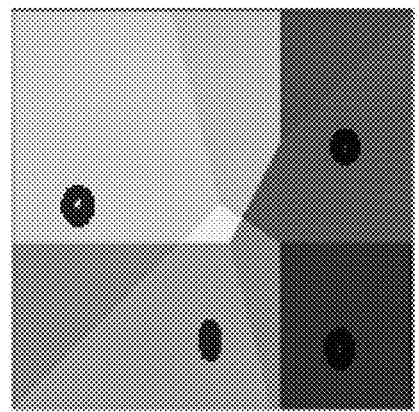
FIG. 5D
FIG. 5A
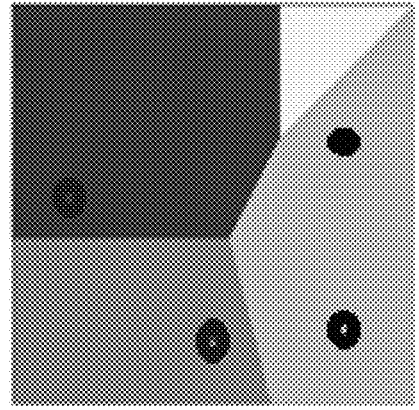
FIG. 5C

FIG. 6

$$M_d = \begin{bmatrix} 0 & 1 & 1 & 1 & 1 & \cdots & 1 \\ 1 & 0 & D_{0,1} & D_{0,2} & D_{0,3} & \cdots & D_{0,n} \\ 1 & D_{1,0} & 0 & D_{1,2} & D_{1,3} & \cdots & D_{1,n} \\ 1 & D_{2,0} & D_{2,1} & 0 & D_{2,3} & \cdots & D_{2,n} \\ 1 & D_{3,0} & D_{3,1} & D_{3,2} & 0 & \cdots & D_{3,n} \\ \vdots & \vdots & \vdots & \vdots & \vdots & \ddots & \vdots \\ 1 & D_{n,0} & D_{n,1} & D_{n,2} & D_{n,3} & \cdots & 0 \end{bmatrix}$$

FIG. 8

Algorithm 1 G2L pseudo-label algorithm, in pseudocode

Require: $Tar \leftarrow$ target dataset of data items, $Tar = \cup\, t_i$
Require: $Full \leftarrow$ semantically-partionable labeled dataset $\{e.g.\ \text{ImageNet1K}\}$
Require: $Part \leftarrow$ partition of $Full$, $Part = \cup\, \{P_j\}$
Require: $f \leftarrow$ classifier $\{e.g.\ \text{VGG16 on Imagenet1K}\}$
Require: $Layer \leftarrow$ feature vector layer $\{e.g.\ \text{second-last}\}$
Require: $Aggr \leftarrow$ feature vector aggregator $\{e.g.\ \text{mean}\}$
Require: $Met \leftarrow$ feature vector metric $\{e.g.\ \text{Euclidean}\}$
Require: $d_{max} \leftarrow$ max simplex dimension $\{e.g.\ 4\}$
Require: $Pol \leftarrow$ extrema decision sequence $\{e.g.\ \texttt{Cfff}\}$
Ensure: pseudo-label sequence $pls_i$ for each $t_i$ 1: INITIALIZATION
2: for each data item $t_i \in Tar$ do
3:     represent $t_i$ by $vert_i \leftarrow Layer$ vector of $t_i$ within $f$
4: end for
5: for each subset $P_j \in Part$ do
6:     represent $P_j$ by set $Sour_j = \cup\, \{sour_{j,k}\} \leftarrow$ aggregation of $Layer$ vectors of $P_j$ within $f$, using $Aggr$
7: end for
8: PROCESS
9: for each $t_i \in Tar$ do
10:     $pls_i \leftarrow ()$
11:     for $d=1$ to $d_{max}$ do
12:         for each $Sour_j$ do
13:             for each $sour_{j,k} \in Sour_j$ do
14:                 $X_{i,j,k} \leftarrow$ simplex, using $vert_i, pls_i, sour_{j,k}$
15:                 for each vertex pair in $X_{i,j,k}$ do
16:                       compute edge distance, using $Met$
17:                 end for
18:                 $cont_{i,j,k} \leftarrow$ content of $X_{i,j,k}$, using $CM$
19:             end for
20:         end for
21:         $e_d \leftarrow argextreme_{j,k}$ of $cont_{i,j,k}$, using $Pol$
22:         $names_d \leftarrow$ names of $sour_{j,k}$, using $(e_d)$
23:         $pls_i \leftarrow (pls_i, names_d)$
24:     end for
25: end for

FIG. 9

| Policy | #P-L | Policy | #P-L | Policy | #P-L |
|---|---|---|---|---|---|
| cccc* | 40 | ffff | 225 | vanilla* | 1000 |
| ccccc* | 103 | cccc | 345 | Ffff* | 1121 |
| fccc | 127 | ccff | 502 | Fcff | 1390 |
| cfffff* | 159 | cfff* | 526 | Fccc* | 1807 |
| c* | 201 | Fccc | 543 | FFFF | 2643 |

FIG. 10

| Dataset | Divergence | Vanilla | G2L |
|---|---|---|---|
| DTD | 0.32 | 0.4388 | 0.4282 |
| CUBS | 0.46 | 0.3485 | 0.2825 |
| CIFAR100 | 0.51 | 0.7320 | 0.7065 |
| UCF101 | 0.69 | 0.7500 | 0.7546 |
| Oxford | 0.70 | 0.7585 | 0.7628 |
| Aircraft | 0.71 | 0.4882 | 0.4744 |
| SVHN | 0.82 | 0.9351 | 0.9385 |
| Omniglot | 0.98 | 0.7961 | 0.7975 |

AUTOMATED DATA LABELING USING A GEOMETRIC APPROACH

BACKGROUND

The present invention relates generally to an automated data labeling method, and more particularly, but not by way of limitation, to a system, method, and computer program product for a content-aware labeling technique for source data for improved transfer learning.

Learning with limited labels is a known problem in conventional techniques for machine learning.

Conventional techniques include transfer learning which can be accomplished through a base model trained on a larger, well labeled (e.g., mostly by humans) dataset and then fine-tuning the labeled dataset for target task (e.g., using its limited dataset). Efforts have been made to harness the potential of large unlabeled images from the wild (e.g., social media platforms) for learning representations in a base model. However, these efforts require some type of labeling of these unlabeled images which is usually very expensive if done manually.

Therefore, there is a technical problem in the art that there is not a cost-effective technique to label datasets without human intervention (i.e., there is no well-established theory for automating the labeling process).

SUMMARY

In view of the above-mentioned problems in the art, the inventors have considered a technical solution to the technical problem in the conventional techniques by providing a technique to automatically create labels independently of the incoming data dimensionality and independently of the number of labels desired.

In an exemplary embodiment, the present invention can provide a computer-implemented automated data labeling method, the method including composing a plurality of semantically-named anchor vectors derived from a plurality of source datasets into a sequence that defines a location description for target data items based on a generalization of distance into Cayley-Menger content and outputting a label for a target data item based on the location description.

In an exemplary embodiment, the present invention can provide a computer-implemented automated data labeling method, the method including composing a semantically-named anchor vector derived from a source dataset into a sequence that defines a location description for target data items based on a generalization of distance into Cayley-Menger content and outputting a label for a target data item based on the location descriptions.

In an alternative exemplary embodiment, the present invention can provide an automated data labeling computer program product, the automated data labeling computer program product including a computer-readable storage medium having program instructions embodied therewith, the program instructions executable by a computer to cause the computer to perform: composing a semantically-named anchor vector derived from a source dataset into a sequence that defines a location description for target data items based on a generalization of distance into Cayley-Menger content and outputting a label for a target data item based on the location descriptions.

In another exemplary embodiment, the present invention can provide an automated data labeling system, the automated data labeling system including a processor; and a memory, the memory storing instructions to cause the processor to perform: composing a semantically-named anchor vector derived from a source dataset into a sequence that defines a location description for target data items based on a generalization of distance into Cayley-Menger content and outputting a label for a target data item based on the location descriptions.

In another exemplary embodiment, the present invention can provide extremizing a geometric content based on the Cayley-Menger content to output an extremized label for the target data.

In another exemplary embodiment, the present invention includes the extremizing in which the geometric content is scaled based on a customer constraint.

In another exemplary embodiment, the present invention includes the Cayley-Menger content being a maximum (or minimum) for a hypervolume.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings.

Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes (and others) of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 1 exemplarily shows a high-level flow chart for an automated data labeling method 100 according to an embodiment of the present invention;

FIGS. 5A-5D exemplarily depict Voronoi tessellation regions in two-dimensions generated by the N=4 points shown as dots according to an embodiment of the present invention;

FIG. 6 exemplarily depicts a particular symmetric (d+2)× (d+2) matrix for the Cayley-Menger computation according to an embodiment of the present invention;

FIG. 8 exemplarily depicts an algorithm for generating the model according to step 103 of method 100 according to an embodiment of the present invention;

FIG. 9 exemplarily depicts a table of different base model datasets sorted by number of labels generated by the method 100 according to an embodiment of the present invention;

FIG. 10 exemplarily depicts experimental results of workloads tested;

DETAILED DESCRIPTION

Figure 2:
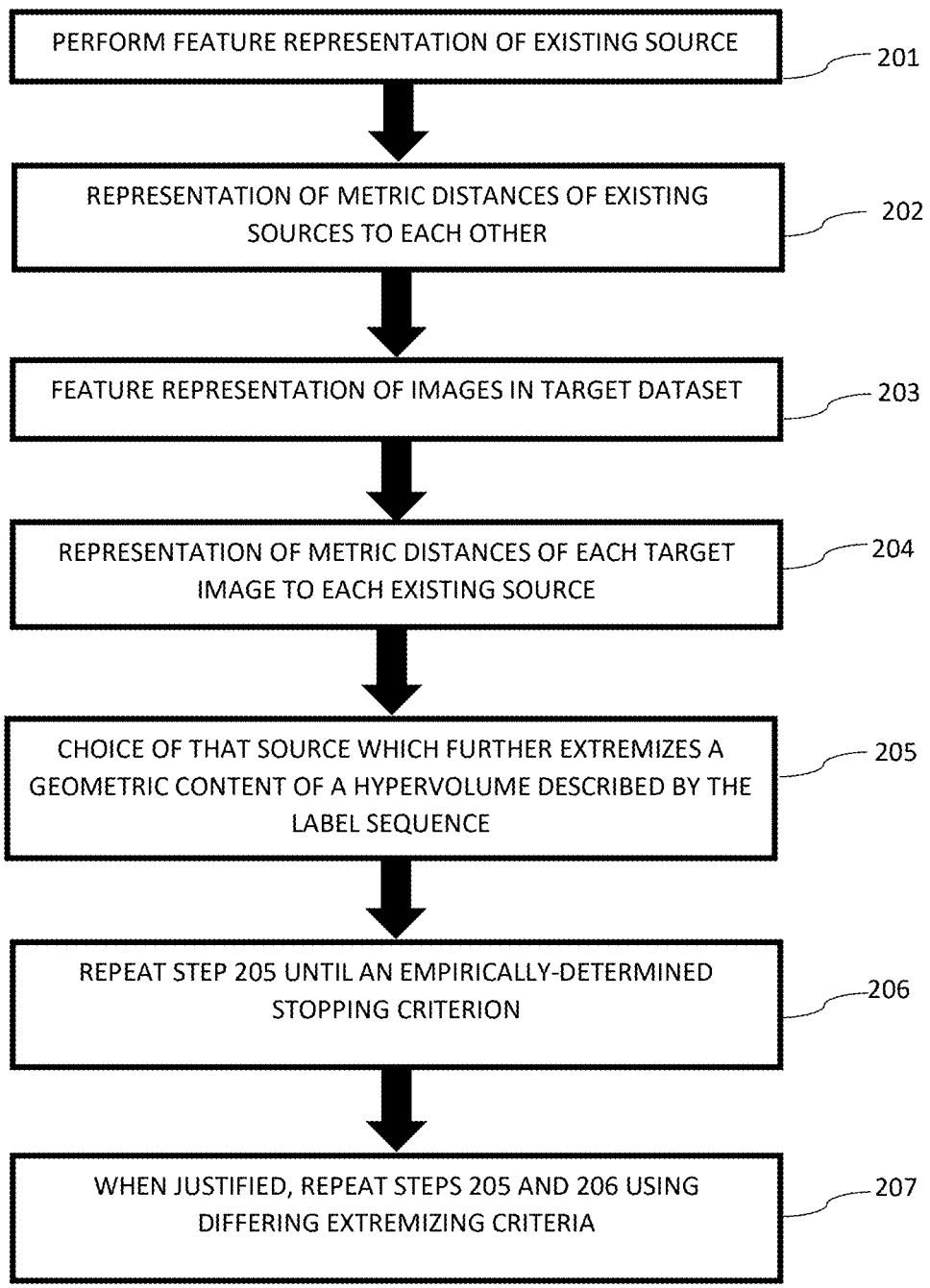
FIG. 2 exemplarily shows a high-level flow chart for an automated data labeling method 200 according to an embodiment of the present invention.

The invention will now be described with reference to FIGS. 1-13, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the exemplary method 100 depicted in FIG. 1, the invention includes various steps for generalizing a concept of closeness of high dimensional data by using a concept of "content" as defined by the Cayley-Menger (CM) determinant. This allows the invention of method 100 to examine candidates for label sources by incrementally adding the candidate that meets a content criterion, such as maximum, minimum, median. This content formalizes an extensible measure of quality of source choice. For example, iteratively choosing minimum content generates labels that tightly characterize incoming data with respect to the known label-space, which is useful if incoming data is known to be similar to the existing sources. Contrarily, iteratively choosing maximum content is more appropriate if incoming data is known to have concepts that are not well captured by existing sources. The inventive technique of method 100 is effective because machine learning algorithms are generally cast in a very high dimensional space which is hard to image and visualize.

Thereby, as described below in reference to the method 100, the invention provides a content-aware labeling technique for source data for better transfer learning. The invention leverages data points (e.g., such as images), and computes labels for the data points by calculating distances of this data point from a set of anchor data points representing known entities, like animals, plants, tools, etc. Then, a label is constructed for this data point based on the distances (e.g., more accurately, based on the higher dimensional generalizations of distance), calculated using a geometric approach. A source model is trained using the automatically labeled data.

Figure 11:
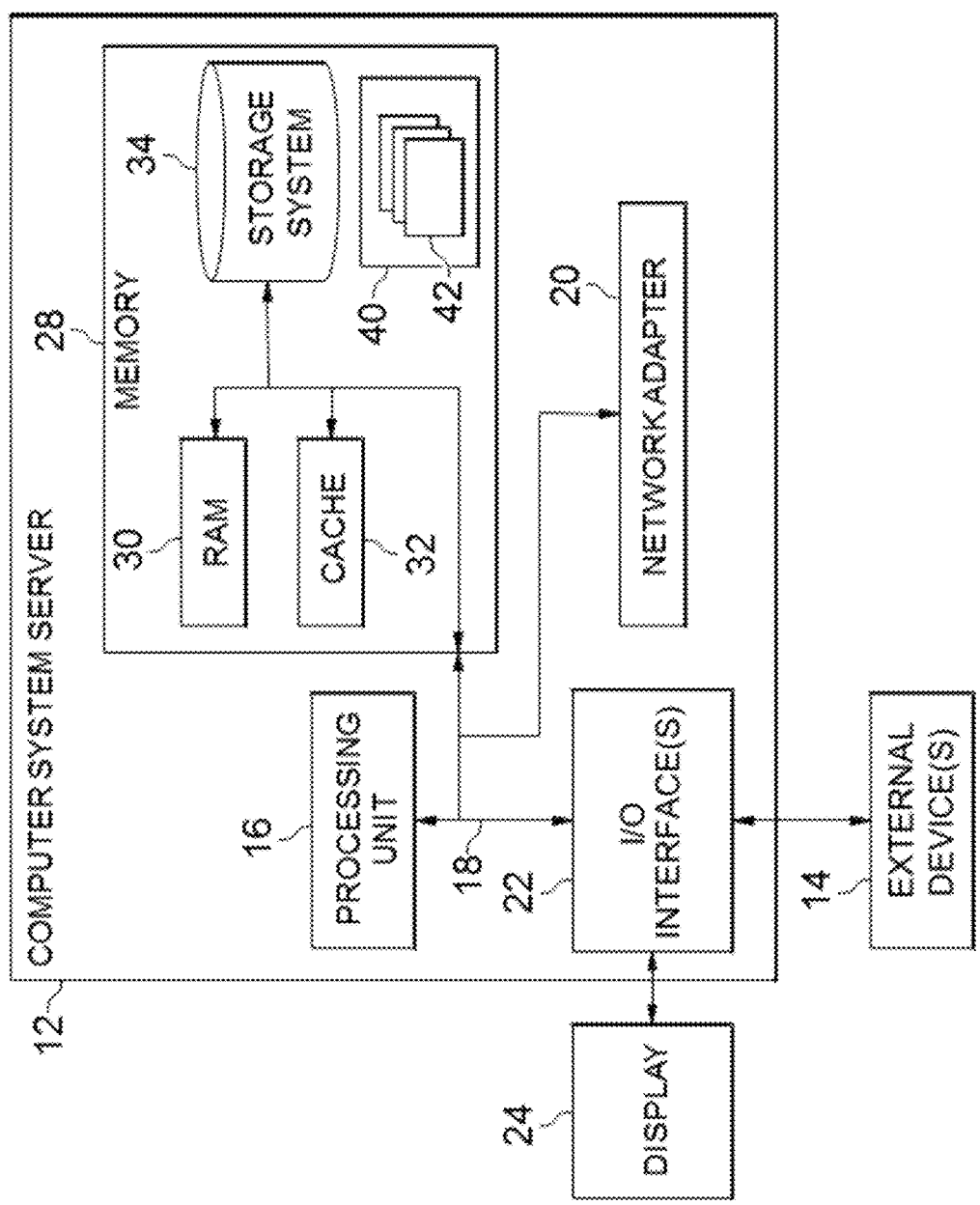
FIG. 11 depicts a cloud computing node 10 according to an embodiment of the present invention.

As shown in at least FIG. 11, one or more computers of a computer system 12 according to an embodiment of the present invention can include a memory 28 having instructions stored in a storage system to perform the steps of FIG. 1.

Although one or more embodiments (see e.g., FIGS. 11-13) may be implemented in a cloud environment 50 (see e.g., FIG. 12), it is nonetheless understood that the present invention can be implemented outside of the cloud environment.

At a high-level, the method 100 and 200 compose a semantically-named anchor vector derived from a source dataset into a sequence that defines a location description for target data items based on a generalization of Voronoi distances into Cayley-Menger content, and a label for a target data item based on the location descriptions is output.

With reference generally to FIG. 1, the claimed invention receives unlabeled data (e.g., images) as an input. The invention creates labels for the images by comparing the images with source labels to determine geometrically which source the image is closest to (or farthest from) such that the image is labeled (i.e., step 101).

For example, the labels are produced according to method 200. If sources are (A) apple, (B) banana, and (C) cantaloupe, the apple, banana, and cantaloupe can be plotted based on size and roundness. The input image of a plantain is plotted to determine the smallest geometric distance where the size and roundness of the plantain is closest to the apple, the banana, or the cantaloupe. Based on this, the result could be that the plantain is closest to the banana, and the best second choice is the cantaloupe since it makes the smallest triangle), therefore making the output label BC (the input image looks more like a banana that is more cantaloupe-like than apple-like). Then, dimensions can be added to form a 3-dimensional tetrahedron, 4-dimensional pentachoron, etc. (i.e., extremizing geometric content). For example, colors can be added to determine if the plantain is closest to the color green. Or, a color can be added such as blue or red to determine that the plantain is farthest from the color (i.e., this represents the supposition that "I don't know what you are, but I know you are not red"). Then, in a $3^{rd}$ dimension (or greater), the smallest tetrahedron (or greater) is also determined to label the input image.

Accordingly, the invention can receive large input databases of unlabeled images (e.g., such as social media), and create labels of these images. The specificity of the label (i.e., how many dimensions) can be selected based on a budget.

Also, step 103 can generate a model for labeling based on training with the input data and the labeled examples.

More specifically, with reference to FIG. 2, in step 201, feature representation of existing source datasets is performed to represent source datasets. For every source dataset $S_i$ in a collection of sources (e.g., typically there are a few dozen such sources), for every image $s_{ij}$ in $S_i$, process $s_{ij}$ by passing it through a reference neural network (NN) architecture and retrieving from layer L of the NN the feature vector $r_{ij}$ of image $s_{ij}$ (layer L is often the second-last layer). Then, in step 201, all of these $r_{ij}$ are aggregated into a representative feature $R_i$ for $S_i$ (e.g., aggregation may be a mean). Optionally, each $R_i$ is normalized into a unit vector according to a metric. Normalization can be by $L_1$ norm, $L_2$ norm, etc.

Figure 3:
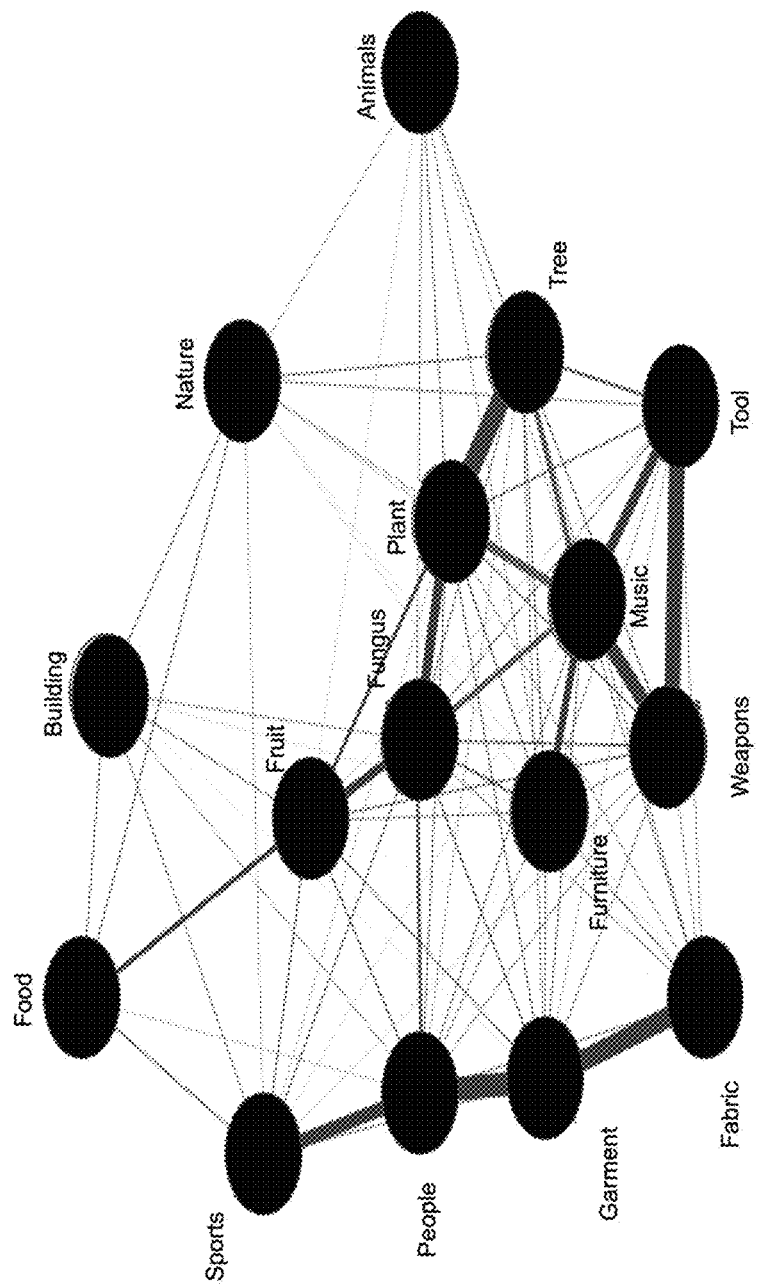
FIG. 3 exemplarily depicts relationships between input images.
Figure 4:
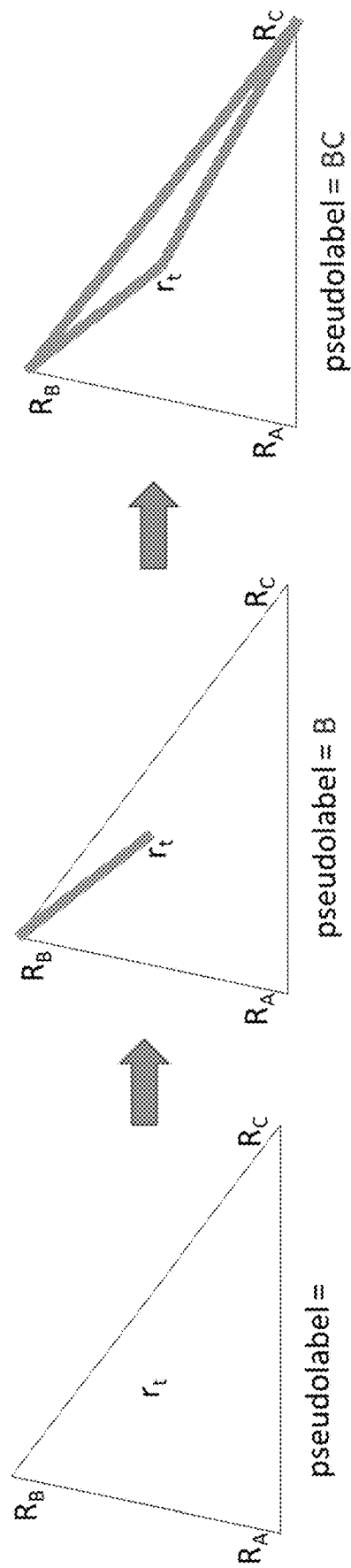
FIG. 4 exemplarily depicts a geometric content according to steps 205-207 of method 200 according to an embodiment of the present invention.

In step 202, metric distances of existing sources are represented to each other (e.g., see FIGS. 3-4). In other words, the cross-distances among sources are represented in step 102. For example, apple (A) is represented to banana (B) and cantaloupe (C). To do this, $D_{ij}$=distance $(R_i, R_j)$ is established for every representative feature $R_i$ and $R_j$. The distance should be a metric such as Euclidean, sqrt of Jensen-Shannon, etc.

In step 203, the target images are represented by feature representation of images in a target dataset. To do this, for every image $t_k$ in the target dataset, process $t_k$ by passing it through the same reference NN architecture to retrieve from layer L of the NN the feature vector $r_k$ of image $t_k$. Step 201 is followed for this to optimally normalize each $r_k$ into a unit vector according to a metric.

In step 204, the distances from the target images to the sources are represented (i.e., the plantain to the sources of ABC). To do this, for each $t_k$ and for each $R_j$, the distance $d_{kj}$=distance $(t_k, R_j)$ is established. Again, the distance should be a metric such as Euclidean, sqrt of Jensen-Shannon, etc.

In step 205, a source is chosen which further extremizes geometric content of the hypervolume described by the label sequence. For example, FIG. 4 depicts an example in 2-dimensional space in which sources are A, B, C with a target image t. The invention minimizes content (e.g., length, then area) of the target image t to the sources A, B, C. In the example above, the invention plots the plantain size and roundness and finds the minimal area of a triangle as the label (i.e., BC as shown in FIG. 4).

To perform the extremizing of the geometric content, the content is computed using the Cayley-Menger (CM) formula, which generalizes the Euclidean length of 1-dimension, and the Heron area of 2-dimensions. In the example of FIG. 4, the content (area) is computed by $-16*C^2$=determinant (M), where M is the special symmetric 4×4 Cayley-Menger matrix, such as shown in FIG. 6.

An algorithm is created to extend the label of the image $t_k$ to an additional dimension (i.e., 2-dimensional triangle to 3-dimensional tetrahedron). To extend the label of the image $t_k$, form the Cayley-Menger matrix M using the target, plus the labels determined so far (in the example, there are two of these), plus and $S_i$ label from a source $S_i$ not yet used in the labeling so far. Then, compute the corresponding left-hand-side coefficient (which is now 288), and the corresponding 5×5 Cayley-Menger matrix, and solve the equation $288*C^2$=determinant (M) for the content of this hypervolume, $C_i$. Lastly, this content is extremized over all the sources $S_i$.

In step 206, step 205 is repeated until an empirically-determined stopping criterion is reached. A stopping criterion is empirical when too few dimensions give too few unique labels and they do not discriminate, or when too many dimensions give too many unique labels and they overfit. Experiments have shown that four (4) dimensions are best for sixteen (16) sources.

Lastly, in step 207, when justified, steps 205 and 206 are repeated using differing extremizing criteria. For example, an extremizing function is empirical and experimentation has shown that if the target set is "close" to the sources (e.g., an apple as an input and a source having a slightly larger apple), use minimum at each step to get a good fit. Otherwise, use maximum to better sample the source space. However, the first label should use minimum, in order to "anchor" the location of the target.

It is noted that the method 200 is geometric, and similar in spirit to that of "barycentric coordinates" where each source representative vector $R_i$ is an "anchor point" in a high-dimensional space and each source has a metric relationship to each other source in this space. Also, many of the incoming target images tend to cluster together in this high-dimensional space so that each cluster will tend to have similar relationships to these anchors. Also, the invention is well-rooted using the Cayley-Menger formula in a new inventive way to obtain a result. Thereby, by using the Cayley-Menger formula, better image labeling can be obtained in higher dimensions. Indeed, prior techniques merely obtained 2-dimensional labels based on a sort function.

With reference generally to FIGS. 1-11, the invention of method 100 and 200 can be presented using a specific case study involving images, and with source datasets created by vertically partitioning ImageNet22K along these distinct subtrees: animal, building, fabric, food, fruit, fungus, furniture, garment, music, nature, person, plant, sport, tool, tree, weapon. They vary in their number of images (e.g., from 103K images for "weapon" to 2,783K images for "animal") and in their number of classes (from 138 for "weapon" to 4,040K for "plant"). These 16 sub-trees were used since they were easy to partition from Imagenet22K, but the method could also be used with a different selection. Each such dataset is represented by a single average feature vector. This study generates this vector from the second to last layer of a reference model trained on ImageNet1K, with the average taken over 25% of all the images in the dataset. To label a new image, the invention first calculates its own feature vector, then computes the Euclidean distance between it and each of the representatives of the datasets. Together with geometric computations in this high dimensional space, these distance measures are then used for labeling purposes.

The invention labeling an image is similar to the "Blind Men and the Elephant" parable, where blind men, who have never learned about an elephant, try to categorize an elephant just by touching it, then relating it to something that they already know. The categorizations of Elephant include Fan (ear), Rope (tail), Snake (trunk), Spear (tusk), Tree (leg), and Wall (flank). Basically, by touching and feeling an elephant, the blind men are measuring its closeness to things known by them. The inventive approach herein also measures the closeness of an unknown image, in feature space, to existing known categories and then generates a label for it.

Additionally, the invention also compares unknown images to the existing categories that are farthest from them. Second, the invention observes a strong predictive relationship between (a) the measurement of the similarity of unknown imagery to existing categories, and (b) the computation of a number of labels necessary to derive good transfer performance. Third, the invention also observes a strong predictive relationship between measured similarity and optimal learning rate.

Generating rich labels from models trained on distributionally similar data involves a tradeoff between an expressive long label, and a generalizable short label. Longer labels carry more information about similarity between previous models and the target image, and differences between the previously trained models could be critical for adequately labeling new examples. For example, a novel set of data including pictures of household objects might be well described by combining the labels of "tool, fabric, furniture."

However, domains that possess substantial differences from previous data might be better defined by the magnitude and direction of such a difference. For example, a "flower" dataset would share some features with "plant," but it is perhaps better defined by statements such as "flowers are very unlike furniture". In other, ambiguous cases, negative features may be necessary to distinguish between overlapping cases: a suit of armor might have similarities with the body shapes of people but could be contrasted with these categories by its dissimilarity with "sport," a category otherwise close to "person."

In the invention, labels for a target dataset can be generated by using: first, a large labeled dataset preferably organized within a semantic hierarchy, such as ImageNet1K, and, second, a robust classifier, such as VGG16 trained on ImageNet1K. The robust classifier tool need not be trained on the labeled dataset tool itself. The labeled dataset can be partitioned into several non-intersecting subsets, each with a semantically meaningful name. For example, ImageNet1K can be partitioned into the 16 non-intersecting sets. The choice of a "good" partition necessarily is heuristic, particularly for target datasets from unusual domains.

The subsets that comprise the partition are referred to as the source subsets. A label for an incoming target data item is defined as the concatenation of some number of source subset names (or an encoding of this concatenation of names), such as the sequence <person, music, tool>. It is noted that this also produces an informative description of the incoming target data item. The choice of a "good" sequence length is again heuristic, but very short sequences would lead to under-fitting models, and the reverse.

It is further noted that feature vector spaces used in machine learning are difficult to visualize, and such high-dimensional spaces generate geometric paradoxes even at relatively low dimensions. For example, each feature vector of a dataset is very likely to be on the convex hull of that dataset's representation in that space. Moreover, with increasing dimensions, the ratio of the distance to the farthest neighbor versus the distance to the nearest neighbor paradoxically tends to approach a value of 1. Nevertheless, although they are widely separated, particular "anchor" vectors can be used to represent other locations in these spaces (or their subspaces) by the well-studied method of barycentric coordinates.

FIGS. 5A-5D depicts Voronoi tessellation regions in two-dimensions generated by the N=4 points shown as the dots. Shaded regions depict equivalence classes of points that share: FIG. 5A "closest point" (policy c), FIG. 5B "top 2 closest points", FIG. 5C "farthest point" (policy f), and FIG. 5D "closest and farthest points" (policy C or F), the intersection of (A) and (C).

Metrics defined over these spaces can be used to partition the space into cells that form equivalence classes of locations based on individual anchor points ("1st-order Voronoi diagram"). These locations are characterizable by geometric properties such as "the nearest point to this cell is P" (e.g., see FIG. 5A). These cells can be efficiently determined.

These metrics can also partition the space into cells that form equivalence classes of locations based on sets of points ("nth-order Voronoi diagram"), characterizable by geometric properties such as "the n-nearest points to this cell are {P1, P2, . . . , Pn}, such as shown in FIG. 5B. The extreme case for N points is the (N−1)th-order partition ("farthest-point Voronoi diagram"), such as shown in FIG. 5C. Additionally, the concepts of lengths and distances in these spaces can be further generalized to that of higher-dimensional "content", following the progression of polytopes as: point, length, area, volume, hypervolume, etc. Elegant algorithms exist for computing their content, in particular the Cayley-Menger determinant.

Putting these observations together above, the invention devises methods 100-200 that compose a small number of semantically-named anchor vectors derived from the source datasets, into a sequence that defines the location descriptions for target data items, based on a generalization of closest and farthest (Voronoi) distances into minimal and maximal (Cayley-Menger) contents. These location descriptions become the labels.

The methods 100-200 generalize the concept of the distance between a target and a single source, to that of the content of a d-dimensional simplex defined by the target and certain well-chosen sources. The computation of content is a well-studied algorithm based on the Cayley-Menger determinant ("CM"). The determinant itself generalizes several earlier classic algorithms, including the Heron formula for the area of a triangle, and the less familiar Piero formula for computing the volume of a tetrahedron.

For a d-simplex, composed of d+1 anchors, the math to compute content Ca proceeds in three steps. First, it forms $M_d$ (e.g., as shown in FIG. 6) a particular symmetric (d+2)× (d+2) matrix. It incorporates a symmetric submatrix that expresses the squares of all pair-wise distances, that is, $D_{i,j}$=distance $(i, j)^2$.

Second, it computes the coefficient aa according to formula (2), which records the effects that various matrix operations have had on the determinant of $M_d$, during its simplification from more complex geometric volume computations into its present form.

$$a_d = (-1)^{d+1} d(d!)^2 \quad (2)$$

Third, it solves for the value of Ca implicitly expressed by the following relation of equation (3).

$$a_a C_d^2 = \det M_d \quad (3)$$

The method 100 and 200 is described by algorithm 1 of FIG. 8. The algorithm requires a number of hyperparameters that are set by experiment. An example is shown for each of these choices, in the pseudocode of the precondition ("require") preamble. These examples use image classification as the domain, and they record the exact configuration that is used in the experiments reported in the rows of FIG. 9. The indicator layer is the choice of a particular layer within the data representation of f, usually but not necessarily the second-to-last. The function Met is the choice of a distance function that has been derived from an inner product, as required for the derivation of CM.

Figure 7:
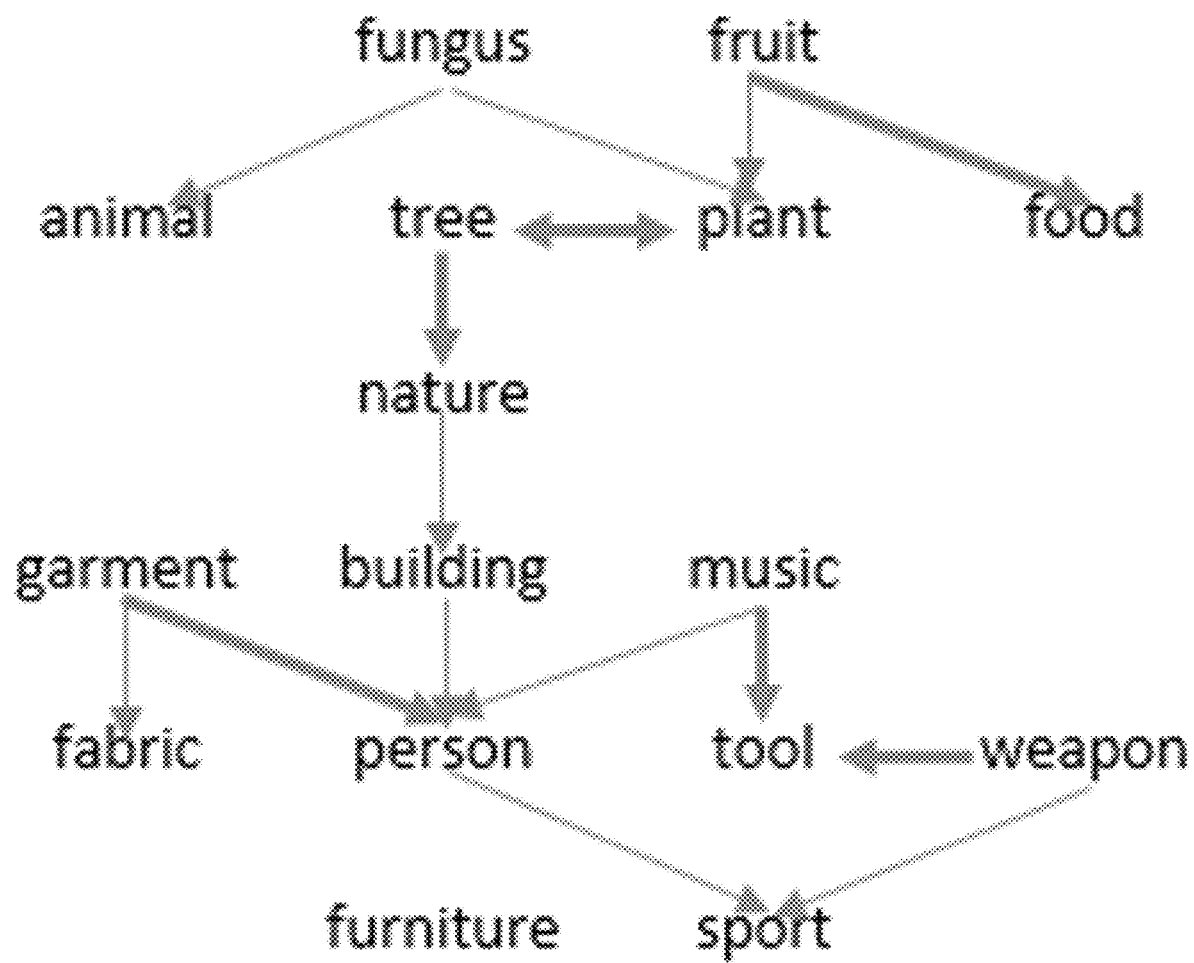
FIG. 7 exemplarily depicts sources under a Euclidean metric according to an embodiment of the present invention.

The method Aggr is the choice of an aggregation method that represents a set of Layer vectors in a sparser form. This can be as trivial as using a single mean vector, or as more elaborate as using a set of representatives derived from clustering methods. For example, as depicted in FIG. 7, the source food is probably adequately represented by a single aggregate vector, but the source fruit probably is better represented by a pair of aggregate vectors $fruit_{plant}$ and $fruit_{food}$.

The integer $d_{max}$ determines the number of dimensions to be explored using CM during the creation of the output label name sequences. It also bounds the length of the name sequence $pls_i$, by $d_{max} \le |pls_i| \le 2d_{max}$. The exact length of $pls_i$, which is constant over a given execution of the complete algorithm, is determined by Pol.

The extrema decision sequence Pol, and its summarizing notation, are best explained by a walkthrough of the algorithm. At d=1, the algorithm considers the length of the line (e.g., the 1-simplex) formed from the target data item ti, and a representative vector $sour_{j,k}$ from the source representation $Sour_j$. If Aggr was a simple mean, then each Sour will be a singleton set. Each $sour_{j,k}$ is examined, and the content (here, the length), computed by CM, is recorded in $cont_{i,j,k}$.

Now, the first dimension's extremizing label sequence $pls_i$ for $t_i$ can be selected, from one of four short sequences: (1) the source name of the closest vector, if Pol starts with <c>, as shown in FIG. 5A; or (2) the source name of farthest vector, if Pol starts with <f>, as shown in FIG. 5C; or (3) the source name of the closest vector followed by the source name of the farthest vector, if Pol starts with <C>, as shown in FIG. 5D; or (4) the source name of the farthest vector followed by the source name of the closest vector, if Pol starts with <F>, as shown in FIG. 5D again.

For example, if Pol=<c>, one possible label pls for a particular $t_i$ could be the sequence <$fruit_{food}$> (e.g., with source fruit in the sense of food). Whereas, if Pol=<F>, it could be <fungus, $fruit_{food}$> instead. The four choices of extremizing policy at any dimension are therefore captured by the quaternary alphabet {c, f, C, F}. And in particular, the policy <C> forms labels consisting of the names of <closest, farthest> pairs.

Proceeding to d=2, the algorithm considers the areas, computed by CM, of the triangle (2-simplex) formed by the target data item $t_i$, a representative vector $sour_{j,k}$, and a single prior extremizing vector, chosen according to the first dimension's policy. This single vector would be the length-minimizing vector if the policy had been <c> or <C>; or the length-maximizing vector if the policy had been <f> or <F>. At this point, again one can efficiently choose one of four short sequences that capture the names of the area-extremizing sources for this dimension's label, which one then can append to the evolving label sequence $pls_i$.

The algorithm proceeds likewise for each higher dimension, up to $d_{max}$, by first building simplices that extend the prior dimension's simplex, and then selecting names according to this higher dimension's policy.

Experimental Evaluation

Using the geometric technique of method 100 and 200, a number of labeled datasets were created, as shown in FIG. 9. ResNet27 models were trained using six of these labeled datasets, creating base models for further transfer learning. These six were: cccc, Cfff, Ffff, FCCC, cccccc, cfffff. These six were chosen because they represent a broad spectrum of unique label counts, they explore policies starting with different initial extremizing decisions, and, finally, they show the effect of increased dimensions.

A baseline model was also created using the vanilla ImageNet1K dataset of images and human-annotated labels. This model attained a top-1 accuracy of 66.6%, which is suitable for a ResNet27 model. The same hyperparameters and training setup were used for all the labeling models. ResNet27 was selected because residual networks are considered state of the art, and ResNet27 is easy to train while being large enough for the datasets.

To evaluate the usefulness of these base models, the inventors focused on eight workloads from the Visual Domain Decathlon and other fine-grained visual classification tasks as targets, as shown in FIG. 10. The choice of target datasets was made to have sufficient diversity in terms of number of labels, number of images, number of images per label, and divergence with respect to ImageNet1K. Divergence is here computed by first normalizing the representative vectors of each dataset so that their components (which are all non-negative) sum to 1, then applying the usual Kullback-Leibler divergence formula.

Since it is only desired to compare the performance of labeling with respect to vanilla ImageNet1K, only those datasets were selected whose transfer learning accuracy under vanilla was not close to 1. This ensures that the comparison with vanilla is not trivial (otherwise, all policies also have accuracies very close to 1). These target workloads were then learned from labeled and human-annotated (e.g., vanilla ImageNet1K) source models over five different learning rates. The inner layers were set to learning rates ranging over 0.001, 0.005, 0.010, 0.015, and 0.020, and the last layer was set to a learning rate ten times that.

Each source model was trained using Caffe1 and SGD for 900K iterations, with a step size of 300K iterations, an initial learning rate of 0.01, and weight decay of 0.1. The target models were trained with identical network architecture but with a training method with one-tenth of iterations (90K) and step size (30K). A fixed random seed was used throughout all training. Thus, a total of 280 transfer learning experiments (with same set of hyperparameters) were conducted (8 workloads×7 sources×5 learning rates). Then, they were compared for top-1 accuracy.

FIG. 10 compares the transfer learning top-1 accuracy of vanilla with the method 100. The method 100 outperforms vanilla in four high divergent cases (e.g., Omniglot, SVHN, Oxford, and UCF101). For the other four cases (e.g., DTD, Cubs, CIFAR100, and Aircraft) where it underperforms, its performance was very similar to vanilla. Interestingly, the inventive approach performs better than vanilla for higher divergent workloads. Taken together, the average of the eight winners, compared to the average of just vanilla, decreases the overall error rate by 0.43%.

Exemplary Aspects. Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11 a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 11, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 12:
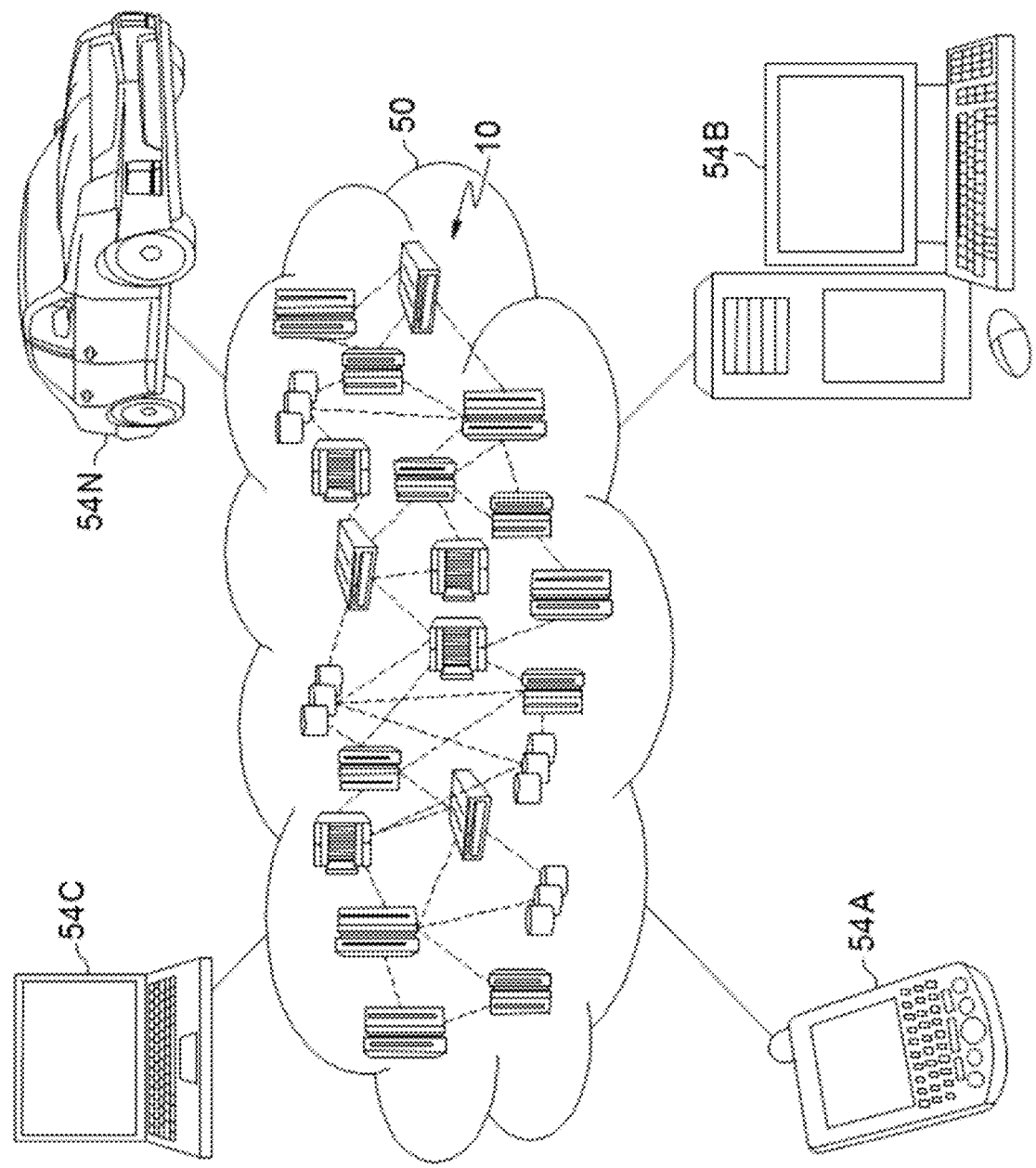
FIG. 12 depicts a cloud computing environment 50 according to an embodiment of the present invention.

Referring now to FIG. 12, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 12 are intended to be illustrative only and that computing nodes 10 and cloud computing environment 50 can communicate with any type of computerized circuit over any type of network and/or network addressable connection (e.g., using a web browser).

Figure 13:
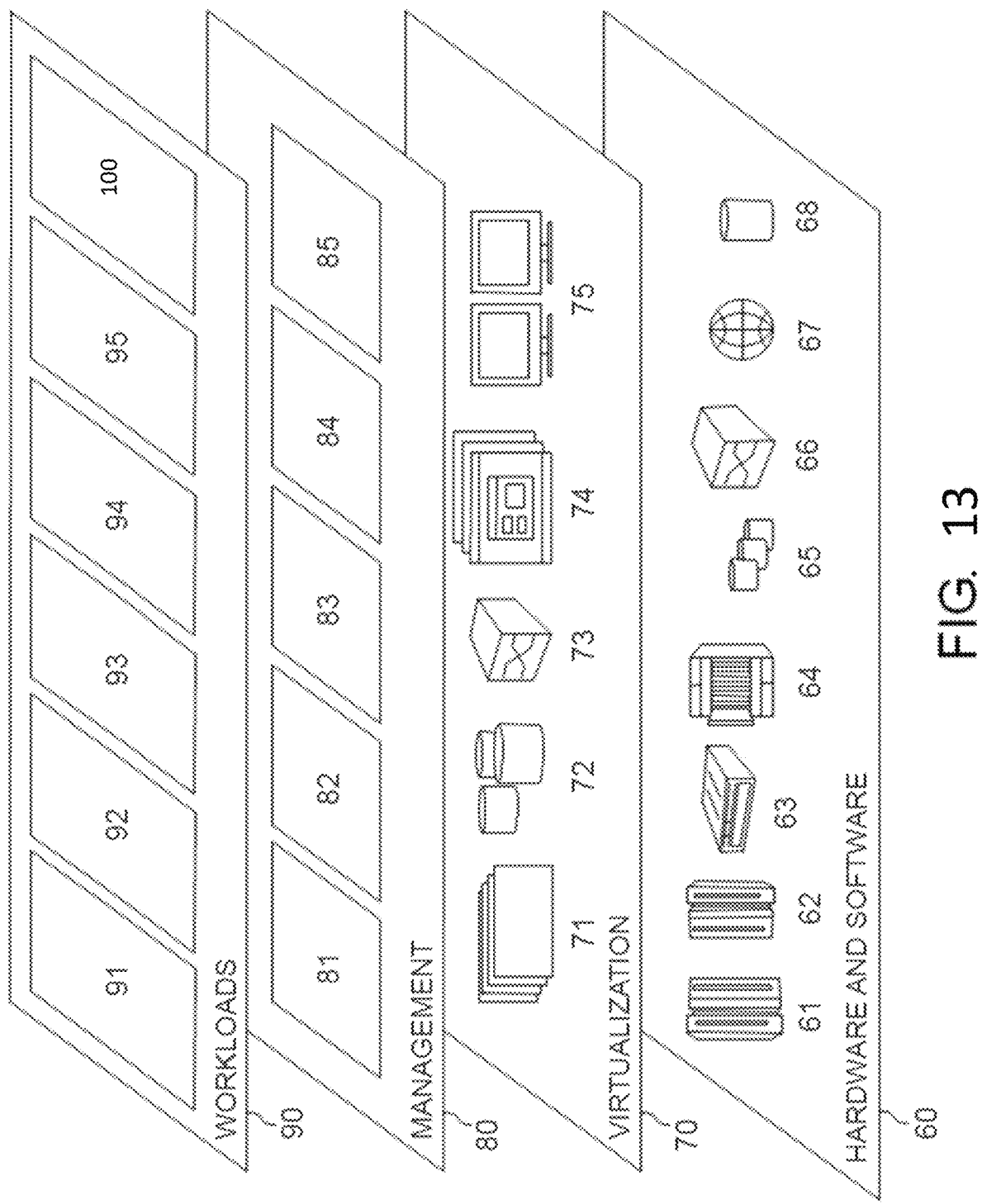
FIG. 13 depicts abstraction model layers according to an embodiment of the present invention.

Referring now to FIG. 13, an exemplary set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the automated data labeling method 100.

The present invention may be a system, a method, and/or a computer program product at any possible technical detail level of integration. The contribution evaluation computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented automated data labeling method, the method comprising:
   mapping, into a vector space, source feature vectors from a source dataset and target feature vectors from a target dataset;
   deriving a semantically-named anchor vector that defines a location description for at least one of the target feature vectors based on extremizing a geometric content formed between the at least one of the target feature vectors and the one or more of the source feature vectors, wherein the geometric content is calculated using Cayley-Menger content; and
   outputting a label for the at least one target feature vector based on the location description, wherein the label is a concatenation of the one or more of the source feature vectors.

2. The computer-implemented automated data labeling method of claim 1, wherein the target dataset comprises images.

3. The computer-implemented automated data labeling method of claim 1, wherein the Cayley-Menger content includes a minimum for a hypervolume.

4. The computer-implemented automated data labeling method of claim 1, wherein the extremizing of the geometric content is scaled based on a customer constraint.

5. The computer-implemented automated data labeling method of claim 1, wherein the Cayley-Menger content includes a maximum for a hypervolume.

6. The computer-implemented automated data labeling method of claim 1, wherein the Cayley-Menger content includes a median for a hypervolume.

7. The computer-implemented method of claim 1, embodied in a cloud-computing environment.

8. An automated data labeling computer program product, the automated data labeling computer program product comprising a computer-readable storage medium having program instructions embodied therewith, the program instructions executable by a computer to cause the computer to perform:
mapping, into a vector space, source feature vectors from a source dataset and target feature vectors from a target dataset;
deriving a semantically-named anchor vector that defines a location description for at least one of the target feature vectors based on extremizing a geometric content formed between the at least one of the target feature vectors and the one or more of the source feature vectors, wherein the geometric content is calculated using Cayley-Menger content; and
outputting a label for the at least one target feature vector based on the location description, wherein the label is a concatenation of the one or more of the source feature vectors.

9. The automated data labeling computer program product of claim 8, wherein the target dataset comprises images.

10. The automated data labeling computer program product of claim 8, wherein the Cayley-Menger content includes a minimum for a hypervolume.

11. The automated data labeling computer program product of claim 8, wherein the extremizing of the geometric content is scaled based on a customer constraint.

12. The automated data labeling computer program product of claim 8, wherein the Cayley-Menger content includes a maximum for a hypervolume.

13. The automated data labeling computer program product of claim 8, wherein the Cayley-Menger content includes a median for a hypervolume.

14. An automated data labeling system, said automated data labeling system comprising:
a processor; and
a memory, the memory storing instructions to cause the processor to perform:
mapping, into a vector space, source feature vectors from a source dataset and target feature vectors from a target dataset;
deriving a semantically-named anchor vector that defines a location description for at least one of the target feature vectors based on extremizing a geometric content formed between the at least one of the target feature vectors and the one or more of the source feature vectors, wherein the geometric content is calculated using Cayley-Menger content; and
outputting a label for the at least one target feature vector based on the location description, wherein the label is a concatenation of the one or more of the source feature vectors.

15. The automated data labeling system of claim 14, wherein the target dataset comprises images.

16. The automated data labeling system of claim 14, wherein the Cayley-Menger content includes a minimum for a hypervolume.

17. The automated data labeling system of claim 14, wherein the extremizing of the geometric content is scaled based on a customer constraint.

18. The automated data labeling system of claim 14, wherein the Cayley-Menger content includes a maximum for a hypervolume.

19. The automated data labeling system of claim 14, wherein the Cayley-Menger content includes a median for a hypervolume.

20. The automated data labeling system of claim 14, embodied in a cloud-computing environment.

\* \* \* \* \*